Oct. 2, 1962 A. PARMET 3,056,641

EXTENSIBLE AND REMOVABLE DRAWER ACCESSORY FOR STANDARDIZED ELECTRONIC CABINET RACKS

Filed July 18, 1958 2 Sheets-Sheet 1

INVENTOR.
ALBERT PARMET

BY

Barnett & Barnett
ATTORNEYS

Oct. 2, 1962 A. PARMET 3,056,641

EXTENSIBLE AND REMOVABLE DRAWER ACCESSORY FOR STANDARDIZED ELECTRONIC CABINET RACKS

Filed July 18, 1958 2 Sheets-Sheet 2

INVENTOR.
ALBERT PARMET

BY

Barnett & Barnett
ATTORNEYS

United States Patent Office 3,056,641

Patented Oct. 2, 1962

3,056,641

EXTENSIBLE AND REMOVABLE DRAWER ACCESSORY FOR STANDARDIZED ELECTRONIC CABINET RACKS

Albert Parmet, West Hempstead, N.Y., assignor to Par-Metal Products Corp., Long Island City, N.Y., a corporation of New York Filed July 18, 1958, Ser. No. 749,367
3 Claims. (Cl. 312—340)

This invention relates to electronic equipment housings, and more particularly is directed to improvements in drawer constructions of the extensible and removable type and means for selective mounting thereof in standardized cabinet racks constituting such housings.

Among the objects of the invention is to generally improve extensible and removable drawer constructions and to provide same for use as universal accessories in standardized electronic cabinet racks, which accessories shall comprise a minimum of simple prefabricated parts that are readily installed in such standardized racks, which shall include a versatile and rugged extensible slide structure capable of supporting the intended weight of a chassis and electronic equipment installed in the drawer, which slide structure shall require a minimum of space within the cabinet thereby increasing the space available for housing equipment, which extensible slide structure shall provide for supporting the drawer and its contents of electronic equipment in a fully extended position exterior to the housing for easy access thereto and permit facile detachment of the drawer from the slide mounting for complete removal, which accessories shall be efficient and practical to a high degree in use.

A feature of the invention is the provision of universal accessories for installation in standard cabinet racks as extensible and removable drawers of sufficient width to accommodate a chassis of corresponding standard size. The accessories include mounting means for adjustably attaching the drawers at any desired vertical position to the front panel mounting flanges of such standard cabinet racks, the extensible slide structure of said accessories being arranged to provide maximum effective usable width between said front panel mounting flanges and to require minimum vertical space within the rack.

Other objects of the invention will in part be obvious and in part hereinafter pointed out.

The invention accordingly consists of features of construction, combination of elements and arrangement of parts which will be exemplified in the construction hereinafter disclosed, the scope of the application of which will be indicated in the claims following.

In the accompanying drawing in which an illustrative embodiment of the invention is shown:

Referring in detail to the drawings, 10 denotes a cabinet assembly having installed therein an extensible and removable drawer accessory 11 embodying the invention. Cabinet assembly 10 may include a single or a plurality of universal cabinet racks and is shown in FIG. 1 as a triple rack structure having full length front doors **10*a* mounted on each end rack and a center rack 10*b* having a plurality of vertically positioned compartments each having a screw fastened front closure panel 10*c*, an extensible writing shelf 10*d* and said drawer accessory 11**.

Center rack **10*b* which may be otherwise of any conventional universal cabinet rack construction is fitted with a pair of vertically extending panel mounting flanges 10*e* bordering opposite sides of the front opening thereof and mounted by suitable means (not shown) to extend toward each other in recessed relation to the front facing surface 10*g* of corner posts 10*h*. Each flange 10*e* may be drilled and tapped with a row of aligned holes 10*f* on standard centers to provide for mounting of front closure panels 10*c*** and other correspondingly drilled parts as hereinafter described.

Figures 1, 2, 3, 4:
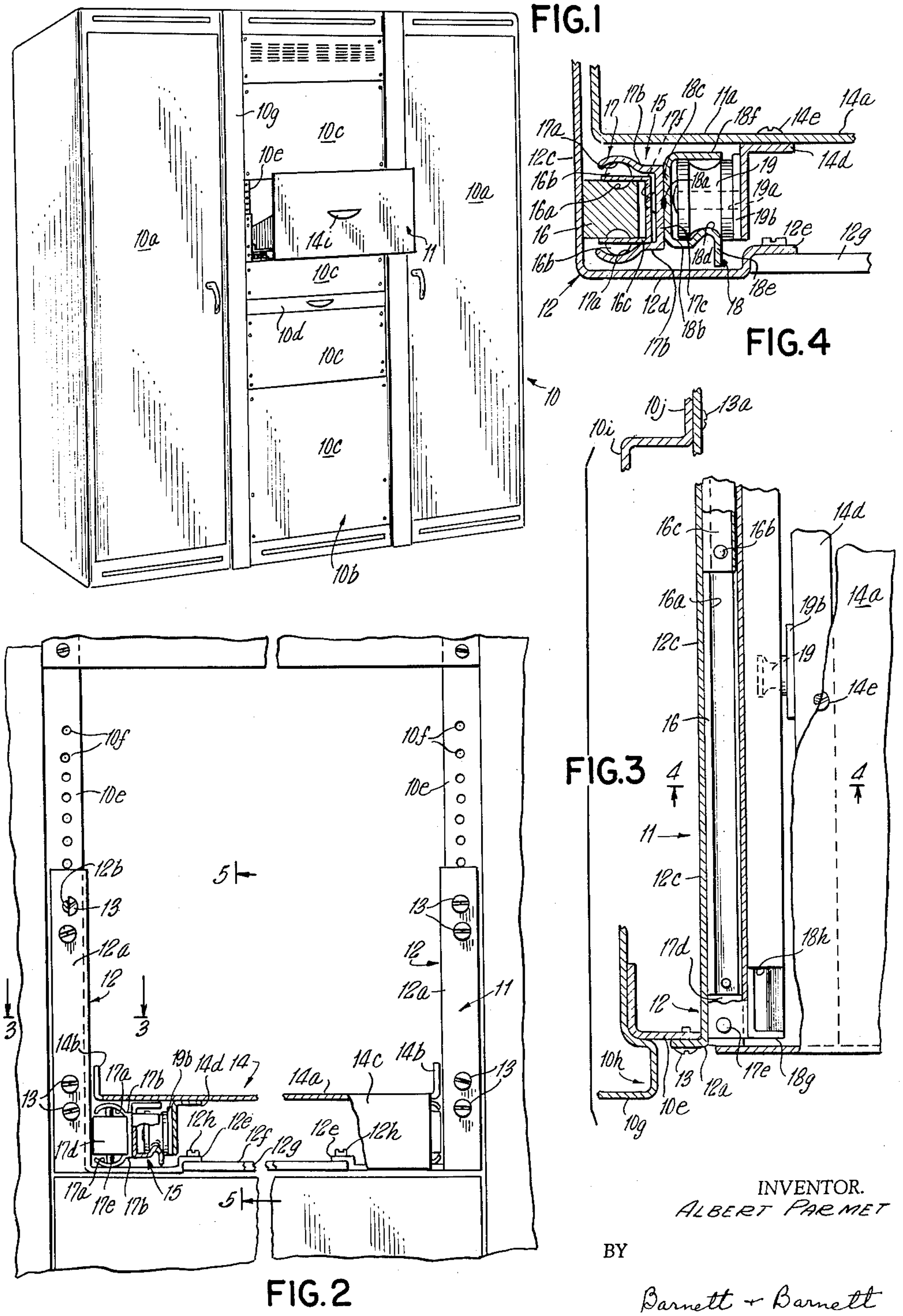
FIG. 1 is a front perspective view of a cabinet housing for electronic apparatus constructed of standard racks and having the improved universal extensible and removable drawer accessory embodying the invention installed therein, the drawer being shown in partly open position.
FIG. 2 is an enlarged detailed view in front elevation of the drawer installation portion of the cabinet housing shown in FIG. 1, the drawer front being removed and parts of the sliding shelf being broken away to show interior structure.
FIG. 3 is an enlarged sectional view taken on line 3—3 in FIG. 2 with parts of the shelf broken away to show underlying structure.
FIG. 4 is a sectional view taken on line 4—4 in FIG. 3 showing details of the compound slide extensible mounting means.

Extensible and removable drawer accessory 11 is designed for installation in any cabinet rack similar to center rack **10*b* at any desired height and includes a pair of supporting brackets 12 of similar but reversed configuration having outwardly turned front flanges 12*a* each drilled with holes 12*b* spaced to align with tapped holes 10*f* for securing to panel mounting flanges 10*e* by screws 13, as shown in FIGS. 2 and 3. Brackets 12 are substantially L-shaped to provide vertical and horizontal members 12*c* and 12*d*, respectively, extending rearwardly from flanges 12*a* into the interior of the rack a distance slightly exceeding the depth of horizontal shelf or bottom 14*a* of drawer 14 as is clear from FIG. 5. An edge portion of each horizontal member 12*d* is offset as at 12*e* and attaches at the front and rear interior facing corners thereof by screws 12*h* to a pair of front and rear transverse brace bars 12*f* and 12*g*, respectively, which interconnect brackets 12 forming a rigid support for drawer 14**.

One of the features of the invention is the compound slide extensible mounting for drawer 14 shown to comprise a pair of compound slides 15 located beneath drawer 14 permitting maximum utilization of cabinet space between panel mounting flanges **10*e*. Compound slides 15, both also being of similar construction but of reversed configuration, are each mounted along the bottoms of vertical members 12*c* of brackets 12 and slightly spaced above horizontal members 12*d*** for operative clearance.

Figures 5, 6:
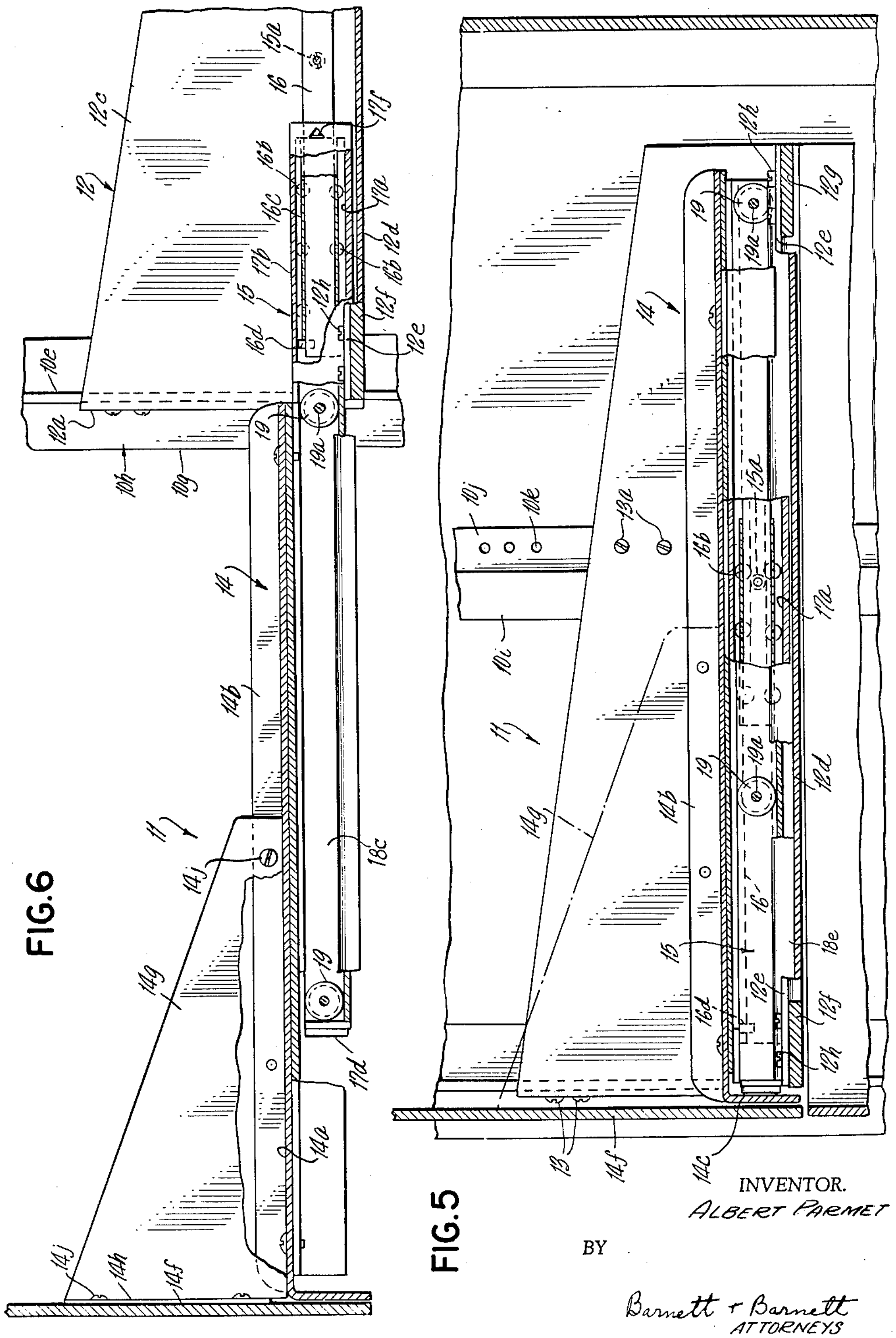
FIG. 5 is a sectional view taken substantially along line 5—5 in FIG. 2 but with the drawer front and supporting bracket attached to form a complete drawer, the latter being shown closed with parts broken away to illustrate interior structure.
FIG. 6 is a view similar to FIG. 5 but with the drawer in fully extended position.

Each compound slide 15 includes a stationary track 16, a slide member 17 extensibly mounted on track 16 and an open sided track 18 secured to or formed as an integral part of slide member 17. Stationary track 16 is suitably secured to bracket vertical member **12*c* as by screws 15*a* and has a pair of longitudinally extending grooves 16*a* formed in the top and bottom thereof. As shown in FIGS. 4 and 5; slide member 17 is channel shaped in cross-section having top and bottom flanges 17*b* formed with interior grooves 17*a* located to register with grooves 16*a*. A plurality of ball bearings 16*b* ride between grooves 16*a* and 17*a* and are retained in a relatively fixed spaced relation with each other by cage 16*c* in the well understood manner. A bumper 17*d* made of a suitable material such as rubber, shown in FIGS. 2 and 3, may be mounted on a pin 17*e* extending between top and bottom flanges 17*b* at the front end of each slide member 17**, the latter when fully retracted extending beyond the front end of stationary track 16. Open sided track 18 is shown in FIG. 4 as having a channel shaped cross-sectional configuration and being secured along vertically disposed intermediate portion 18c thereof to the corresponding intermediate portion 17c of slide member 17 in a back to back relation as by welds 18a. Bottom flange 18b of track 18 is shaped to form a raised interior runner 18d for receiving grooved rollers 19 of drawer 14. The free edge portion 18e of bottom flange 18b may be turned downwardly to extend substantially at right angles to said flange 18b to rigidify runner 18d against buckling under weight of drawer 14. A top flange 18f is spaced from bottom flange 18b retaining said rollers 19 on runner 18d, a portion of flange 18f adjacent front closure wall and stop means 18g being cut out at 18h for permitting disengagement of rollers 19 therethrough.

Slide member 17 may be retained against complete separation from track 16 when fully extended in any well known manner, such as by pin 16d upstanding at the forward end of groove 16a and indentation 17f formed adjacent the rear end of slide member intermediate portion 17c. As is clear from FIG. 6, in the fully extended stop position of slide member 17, the front end of cage 16c abuts pin 16d and indentation 17f extends across the path of cage 16c and engages the rear end thereof preventing further forward movement of slide member 17 on track 16.

Drawer 14 is shown in FIGS. 2, 4 and 6 to comprise a horizontal shelf or bottom 14a having opposite upturned side flanges 14b and a front downturned flange 14c extending to substantially conceal compound slides 15. A pair of angle irons 14d are secured, as by screws 14e, as supports beneath drawer bottom 14a and extend in front to rear parallel relation spaced inwardly with respect to compound slides 15, each angle iron 14d mounting a pair of said grooved rollers 19 positioned to engage in track 18. Each roller 19 may be rotatably mounted in any suitable manner, such as, on a stub shaft 19a extending from a mounting plate 19b which in turn may be secured as by welding (not shown) to angle iron 14d. Front flanges 14h of a pair of side brackets 14g may be used to mount a drawer front 14f on drawer bottom upturned side flanges 14b. The latter, side brackets 14g and drawer front 14f are secured together by suitable means, such as tapped holes and screws 14j and fitted with handle 14i to complete drawer 14.

One of the features of the invention is the provision of an extensible and removable drawer accessory which can be installed in conventional electronic cabinet racks at minimum cost and with relative ease. To this end, supporting brackets 12 when made of 7/64 gauge metal and attached solely to panel mounting flanges 10e have been found satisfactory in supporting up to about 60 lbs. of equipment installed in drawer 14. However, where the cabinet racks are equipped on opposite sides thereof with one or more conventional vertical side supports 10i shown in FIGS. 3 and 5 to include a flange 10j having a row of tapped aligned holes 10k on standard centers similar to flange 10e, supporting brackets 12 may also be provided with registering holes in vertical member 12c for attachment to flange 10j by screws 13a for additional strength and stability.

After providing the parts comprising drawer accessory 11, namely, the pair of support brackets 12 mounting compound slides 15, front and rear connecting bars 12f and 12g and drawer 14 fitted with angle irons 14d carrying rollers 19, constructed in the manner hereinbefore described, installation thereof at a desired height in any standard cabinet rack may be readily accomplished with the requirement of a minimum of skill. Front flanges 12a of brackets 12 are first attached to panel mounting flanges 10e by screws 13 and brackets 12 interconnected by securing connecting bars 12f and 12g thereto. Drawer 14 may now be removably mounted in position for extensibility by first fully extending slide members 17 and open sided tracks 18, then placing rear rollers 19 through cut-outs 18h and on to runners 18d, moving drawer 14 rearwardly with respect to open sided tracks 18, and, as front rollers 19 approach the forward end of tracks 18, raising the front of drawer 14 to permit the front rollers 19 to enter cut-outs 18h, for positioning on runners 18d as shown in FIG. 6.

The installation of drawer 14 for extensible movement from the fully open position, shown in FIG. 6, to the closed position, shown in FIG. 5, is now complete. By reversing the process in the well understood manner, drawer 14 is easily removed from its mounting when access to electronic equipment carried thereby so requires.

Where the interior of the cabinet rack is fitted with vertical side supports 10i, and prior to the installation of drawer 14, vertical members 12c of brackets 12 may be secured to flanges 10j by screws 13a as and for the purpose hereinbefore described.

The practical utility of drawer accessory 11 will now be apparent. Electronic equipment racks have been standaridized to accommodate standard chassis of 17 inch and 22 inch widths. The 17 inch chassis, for example, fits a standard rack in which the clearance between the free edges of the front vertically extending panel mounting flanges 10e is 17¾ inches. Thus, a drawer shelf 14a of a width sufficient to accommodate a standard 17 inch chassis can readily be mounted in such present standard cabinet racks by means of brackets 12 and associated structure, particularly by virtue of the lateral horizontal relation of stationary track 16, slide member 17 and open sided track 18 comprising compound slide 15 as hereinbefore described and shown in FIG. 4, with a loss of no more than 1½ inches of usable vertical space.

It is thus seen that there is provided an extensible and removable drawer accessory for standardized electronic cabinet racks of the character described in which the several objects of this invention are achieved and which are well adapted to meet the conditions of practical use.

As various possible embodiments might be made of the above invention, and as various changes might be made in the embodiment above set forth, it is to be understood that all matters herein set forth or shown in the accompanying drawing are to be interpreted as illustrative and not in a limiting sense.

Having thus described my invention, I claim as new and desire to secure by Letters Patent:

1. An extensible and removable drawer mounting accessory for electronic cabinet racks having vertically extending front panel mounting flanges, said accessory comprising a pair of brackets, each bracket having a vertical and horizontal member forming a substantially L-shaped cross-section and an outwardly bent front flange extending from said vertical member at right angles thereto for securing the bracket to said panel mounting flanges, a pair of compound slides, one slide carried by the vertical member of each bracket spaced adjacent said horizontal member, each of said compound slides including a stationary track rigidly attached to the bracket, a slide member extensibly mounted on said track and an open sided track mounted to move with said slide member, said open sided tracks each having a pair of spaced substantially horizontally extending flanges forming a top and bottom closure for said track, said stationary track, slide member and open sided track all being arranged in lateral horizontal relation to each other to conserve cabinet space in a vertical dimension, and a drawer bottom plate having a width just short of the spacing between said front panel mounting flanges mounted above said compound slides having roller means therebeneath engaging each of said open sided tracks for extensible support on said bottom closure flanges, a front portion of said open sided track top closure flanges being cut out to permit removal of the roller means from said engagement in the track for separation of the drawer bottom plate from the compound slides.

2. An extensible and removable drawer mounting accessory for electronic cabinet racks having spaced vertically extending front panel mounting flanges, a drawer bottom plate having a width just short of the spacing between said front panel mounting flanges, said accessory comprising a pair of brackets, each bracket having a vertical and horizontal member forming a substantially L-shaped cross-section and an outwardly bent front flange extending from said vertical member at right angles thereto for securing the bracket to one of the panel mounting flanges, each of said brackets extending rearwardly into the cabinet rack substantially the depth of said drawer bottom plate, means interconnecting said horizontal members of the brackets to form a rigid drawer supporting structure, a pair of compound slides, each including a stationary track rigidly attached to said vertical members of one of the brackets spaced adjacent said horizontal members, a slide member extensibly mounted on said track and an open sided track supported by and mounted to move with said slide member, said stationary track, slide member and open sided track all being arranged in lateral horizontal relation to each other to conserve cabinet space in a vertical dimension, said drawer bottom plate having roller means therebeneath engaging each of said open sided tracks for extensible support thereby, said open sided tracks each having a pair of spaced substantially horizontally extending flanges forming a top and bottom closure for said track, said bottom flanges being shaped to form raised interior runners, said roller means being grooved to receive said runners, a free edge portion of each of said bottom flanges associated with said runner being turned downwardly at right angles to said horizontal for rigidifying the runner against buckling.

3. An extensible and removable drawer mounting accessory for electronic cabinet racks having vertically extending front panel mounting flanges, said accessory comprising a pair of brackets, each bracket having a vertical and horizontal member forming a substantially L-shaped cross-section and an outwardly bent front flange extending from said vertical member at right angles thereto for securing the bracket to said panel mounting flanges, a pair of compound slides, one slide carried by the vertical member of each bracket spaced adjacent said horizontal member, each of said compound slides including a stationary track rigidly attached to the bracket, a slide member extensibly mounted on said track and an open sided track mounted to move with said slide member, said stationary track, slide member and open sided track all being arranged in lateral horizontal relation to each other to conserve cabinet space in a vertical dimension, and a drawer bottom plate having a width just short of the spacing between said front panel mounting flanges mounted above said compound slides having roller means therebeneath engaging each of said open sided tracks for extensible support thereby, said open sided tracks each having a pair of spaced substantially horizontally extending flanges forming a top and bottom closure for said track, said bottom closure flanges being shaped to form raised interior runners, said roller means being grooved to receive said runners for reciprocating support thereon, said top and bottom closure flanges being spaced to confine said roller means to said runners, a free edge portion of each of said bottom flanges associated with said runner being turned downwardly at right angles to said horizontal for rigidifying the runner against buckling, a front portion of said open sided track top closure flanges being cut out to permit removal of the roller means from said confinement in the track for separation of the drawer bottom plate from the compound slides.

References Cited in the file of this patent

UNITED STATES PATENTS

| | | |
|---|---|---|
| 884,525 | Ripson | Apr. 14, 1908 |
| 1,582,556 | Stuck | Apr. 27, 1926 |
| 1,948,118 | Klemme | Feb. 20, 1934 |
| 2,155,654 | Haley | Apr. 25, 1939 |
| 2,468,990 | Lundstrom | May 3, 1949 |
| 2,481,186 | Zuck | Sept. 6, 1949 |
| 2,614,022 | Kurtzon | Oct. 14, 1952 |
| 2,624,094 | Smith | Jan. 6, 1953 |
| 2,809,086 | Fall | Oct. 8, 1957 |